US006171384B1

(12) United States Patent
Conley et al.

(10) Patent No.: US 6,171,384 B1
(45) Date of Patent: Jan. 9, 2001

(54) HIGH SURFACE AREA SILICATE PIGMENT AND METHOD

(75) Inventors: Donald P. Conley, Conowingo; Gary W. Loock, Forest Hill; Barry W. Preston, Whiteford, all of MD (US); Michael C. Withiam, Landenberg, PA (US)

(73) Assignee: J. M. Huber Corp., Edison, NJ (US)

( * ) Notice: Under 35 U.S.C. 154(b), the term of this patent shall be extended for 0 days.

(21) Appl. No.: 09/072,424

(22) Filed: May 4, 1998

(51) Int. Cl.[7] ............................. C09C 1/28; C01B 33/12; C01B 33/26
(52) U.S. Cl. ...................... 106/483; 106/482; 106/492; 423/335; 423/339
(58) Field of Search .................. 106/482, 483, 106/492; 423/335, 339; 524/492, 493; 428/212, 206, 211, 331, 537.5

(56) References Cited

U.S. PATENT DOCUMENTS

| | | | |
|---|---|---|---|
| 3,967,563 | * | 7/1976 | Wason ................................ 432/339 |
| 3,988,162 | | 10/1976 | Wason . |
| 4,040,858 | * | 8/1977 | Wason ................................ 423/339 |
| 4,067,746 | * | 1/1978 | Wason et al. ..................... 423/339 |
| 4,191,742 | * | 3/1980 | Wason et al. ..................... 423/339 |
| 4,202,813 | | 5/1980 | Wason . |
| 4,217,240 | | 8/1980 | Bergna . |
| 4,260,454 | | 4/1981 | Wason et al. . |
| 4,336,245 | | 6/1982 | Wason . |
| 4,497,918 | | 2/1985 | Wason . |
| 4,629,588 | * | 12/1986 | Welsh et al. ....................... 423/339 |
| 4,780,356 | | 10/1988 | Otouma et al. . |
| 4,892,591 | * | 1/1990 | Ogawa et al. ..................... 106/482 |
| 4,892,787 | | 1/1990 | Kruse et al. . |
| 5,209,947 | | 5/1993 | Taylor et al. . |
| 5,238,605 | * | 8/1993 | Abeler et al. ..................... 524/492 |
| 5,270,103 | | 12/1993 | Oliver et al. . |
| 5,419,888 | | 5/1995 | McGill et al. . |
| 5,541,633 | | 7/1996 | Winnik et al. . |
| 5,720,806 | | 2/1998 | Fujii et al. . |
| 5,800,608 | * | 9/1998 | Bomal et al. ..................... 106/492 |
| 5,876,494 | * | 3/1999 | Bomal et al. ..................... 106/492 |

* cited by examiner

*Primary Examiner*—Michael Marcheschi
(74) *Attorney, Agent, or Firm*—Kenneth Crimaldi; Robert A. Koons, Jr.; Pepper Hamilton LLP

(57) ABSTRACT

An amorphous silicate pigment having a pore volume of at least about 4.0 ml/g as measured by mercury intrusion, a BET surface area of at least about 300 $m^2/g$, and an $Al_2O_3$ content of about 2.0–10.0 wt % is provided. The invention can be successfully used in recording media coatings, particularly coatings for recording media used in ink jet printing systems.

25 Claims, 1 Drawing Sheet

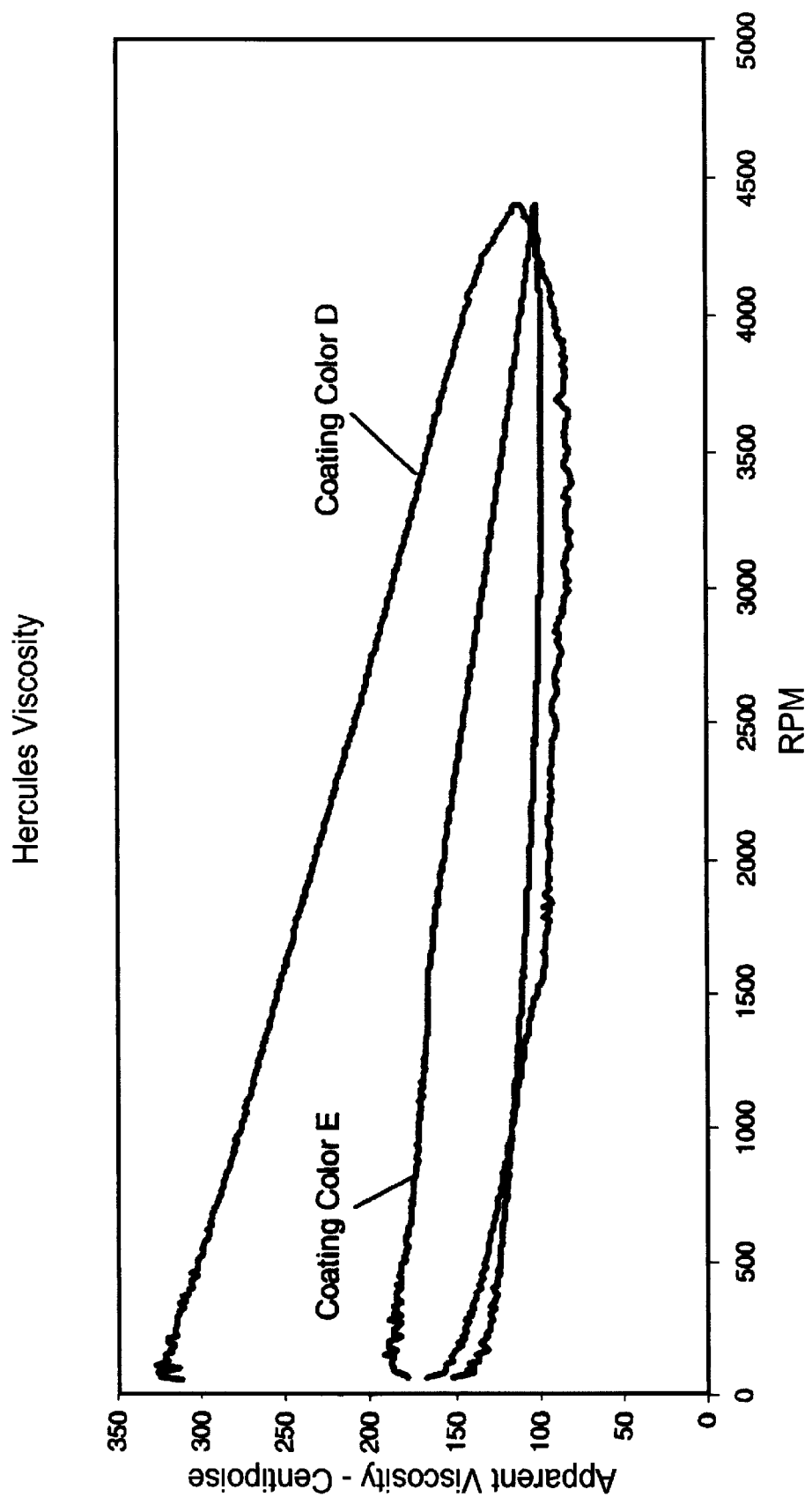

HIGH SURFACE AREA SILICATE PIGMENT AND METHOD

FIELD OF THE INVENTION

The invention relates to a high surface area amorphous silicate pigment, and a method of making the same. More particularly, the invention relates to a high surface area amorphous silicate pigment which is useful in a variety of recording media coatings, especially coatings for ink jet printer recording sheets, and a method of making the same.

BACKGROUND OF THE INVENTION

Ink jet printing systems can generally be divided into two types: continuous stream and drop-on-demand. In continuous stream ink jet systems, ink is emitted in a continuous stream under pressure through at least one orifice or nozzle. The ink stream is then perturbed, causing it to break up into droplets at a fixed distance from the orifice. At the break-up point, the droplets are charged in accordance with digital data signals and passed through an electrostatic field which adjusts the trajectory of each droplet, thereby directing the droplet to a gutter for recirculation or to a specific location on a recording medium. In drop-on-demand systems, a droplet is expelled from an orifice directly to a position on a recording medium in accordance with digital data signals. A droplet is not formed or expelled in drop-on-demand systems unless it is to be placed on the recording medium.

Ink jet inks may be water-based, or may employ an alkylene glycol or other solvent base. Regardless of the type of ink used, the surface chemistry of the recording medium largely determines the print quality. Therefore, recording media for ink jet and other printing systems have utilized pigment-containing coatings to sorb the solvent of the ink (i.e., dry the ink) and hold its dye-component to maximize the color development and visual effect of the ink. It is known that highly porous, high surface area pigments are especially effective in this regard, as such pigments maximize the amount of ink dye positioned in the path of light reflected from the substrate to the eye, while at the same time minimizing the dye absorbed in the pigment layer or paper substrate.

The drawback of these highly porous, high surface area pigments has been that they also rapidly build viscosity in aqueous systems and coating compositions as loading levels increase. Consequently, coating suspensions of known highly porous/high surface area pigments can only achieve about 10–20% pigment solids before their viscosities exceed practical levels for processing and application. This disadvantageously limits the amount of high surface area pigment that can be effectively utilized in recording media coatings, thereby lowering the solids content and reducing the weight of the coatings. Coating performance suffers as a consequence.

OBJECTS OF THE INVENTION

It is accordingly an object of the invention to provide a high porosity, high surface area amorphous silicate pigment which can be loaded at high levels into coatings for ink jet recording media and other recording media.

Other objects will become apparent from the detailed description of the invention provided below.

SUMMARY OF THE INVENTION

Briefly, the invention is an amorphous silicate pigment having a pore volume of at least about 4.0 ml/g as measured by mercury intrusion, a BET surface area of at least about 300 $m^2/g$, preferably about 400 to 500 $m^2/g$, and an $Al_2O_3$ content of about 2.0 to 10.0 wt %, preferably about 3.0 to 7.0 wt %. The invention preferably has a linseed oil absorption of about 180 to 250 cc/100 g, more preferably about 190 to 220 cc/100 g. The invention preferably has a pore volume as measured by mercury porosimetry of about 4 to 7 cc Hg/g with a pore size maximum of about 0.005 to 0.030 $\mu$m diameter, more preferably a pore volume of about 5 to 6 cc Hg/g with a pore size maximum of about 0.014±0.003 $\mu$m diameter. The invention preferably has an average particle size as measured by laser light scattering of about 2 to 8 $\mu$m, more preferably about 4 to 6 $\mu$m. The invention preferably exhibits a CTAB surface area of about 150 to 300 $m^2/g$, more preferably about 170 to 250 $m^2/g$.

The method of the invention involves the addition of a reactive source of aluminum to a reaction medium during the precipitation of a silicate pigment. The temperature of the reaction medium during the precipitation reaction is controlled between about 50 to 85° C. Preferably, the reactive source of aluminum is sodium aluminate, aluminum chloride and/or aluminum sulfate (alum), and is more preferably alum.

The invention also encompasses a coating for a print recording substrate, the coating containing a binder and an amorphous silicate pigment having the physical characteristics described above. Preferably, the coating is in the form of an aqueous slurry containing at least 30% pigment solids of an amorphous silicate pigment having the physical characteristics described above such that the Brookfield viscosity of the pigment slurry at 10 rpm is less than about 10,000 cps.

The invention further encompasses a print recording medium comprising a print recording substrate and an amorphous silicate pigment having the physical characteristics described above.

BRIEF DESCRIPTION OF THE DRAWING

The FIGURE is a graphic depiction of the Brookfield viscosity and Hercules rheology of a coating color containing a silicate pigment in accordance with the invention and a coating color containing a conventional pigment.

DETAILED DESCRIPTION OF THE INVENTION

We have discovered a highly porous, high surface area, amorphous silicate pigment which can be made into a high solids aqueous slurry for use in coatings for print recording media. Surprisingly, even without the aid of a dispersant, the silicate of the invention can be loaded at 30% pigment solids in aqueous suspension. Over 30% pigment solids can easily be attained with the silicate of the invention when a simple phosphate, acrylate or other dispersant known in the art is utilized in the suspension. The remarkable combination of excellent rheology and high porosity provided by the inventive silicate enhances coating performance, i.e., the inventive silicate enables color development beyond that achievable with conventional synthetic fillers.

The silicate pigment of the invention is a medium structure silicate in accordance with the definitions set forth in the *J. Soc. Cosmet. Chem.*, 29, 497–521 (August 1978) and *Pigment Handbook: Volume 1, Properties and Economics*, 139–159, (P. A. Lewis 2d ed. 1988). The silicate pigment has a mercury intrusion pore volume of at least about 4.0 ml/g and a BET surface area of at least about 300 $m^2/g$, preferably about 300 to 500 $m^2/g$. In addition, the silicate pigment contains $Al_2O_3$ at about 2.0 to 10.0 wt %, preferably about 3.0 to 7.0 wt %. We discovered that silicate pigments possessing this combination of physical characteristics surprisingly provide a previously unknown and remarkable combination of rheological and color development advantages in recording media applications. While not being limited to a particular theory, we believe that the high alumina content of the inventive silicate pigment results in a unique silicate structure that surprisingly combines the performance advantages of a highly porous, high surface area material with excellent rheological characteristics.

In addition to the characteristics described above, silicate pigments in accordance with the invention preferably have a linseed oil absorption of about 180 to 250 cc/100 g, more preferably about 190 to 220 cc/100 g; a pore volume as measured by mercury porosimetry of about 4 to 7 cc Hg/g with a pore size maximum of about 0.005 to 0.030 $\mu$m diameter, more preferably a pore volume of about 5 to 6 cc Hg/g with a pore size maximum of about 0.014±0.003 $\mu$m diameter; an average particle size as measured by laser light scattering of about 2 to 8 $\mu$m, more preferably about 4 to 6 $\mu$m, and a CTAB surface area of about 150 to 300 $m^2/g$, more preferably about 170 to 250 $m^2/g$.

The method of the invention involves the addition of a reactive source of aluminum to a reaction medium during a precipitation reaction of a silica pigment, wherein the reaction medium is maintained at a temperature of about 50 to 85° C. during precipitation. We discovered that the relatively low reaction medium temperature is important to the success of the invention; typical silica precipitation reactions utilize higher reaction temperatures. The reactive source of aluminum is not particularly limited, and is preferably at least one of sodium aluminate, aluminum chloride and aluminum sulfate (alum). More preferably, the reactive aluminum source is alum. Save for the low precipitation temperature, the silica precipitation reaction is preferably conducted in a manner conventionally known to produce a low structure silica in accordance with the "low structure silica" definitions set forth in the *J. Soc. Cosmet. Chem.*, 29, 497–521 (August 1978) and *Pigment Handbook: Volume 1, Properties and Economics*, 139–159, (P. A. Lewis 2d ed. 1988). After the precipitation reaction and recovery of the product silicate pigment, the pigment may be micronized or milled by any conventional means to enhance total porosity.

The coating for a print recording medium in accordance with the invention comprises a binder and an amorphous silicate pigment having the physical characteristics in accordance with the invention as described above. The binder can be any material suitable for print recording substrate applications, examples of which include starch, latex, polyvinyl alcohol and other such binders as known in the art. Preferably, the coating is in the form of an aqueous slurry containing at least 30% pigment solids of the amorphous silicate pigment of the invention such that the Brookfield viscosity of the coating at 10 rpm is less than about 6,000 cps.

The print recording medium of the invention is a print recording substrate which contains an amorphous silicate pigment having physical characteristics in accordance with the invention as described above. The print recording substrate can be any material that can accommodate a silicate pigment in accordance with the invention, examples of which include paper, mylar, fabric, vinyl and acetate films.

Physical characteristics of the silicates and silicas as described herein are determined using the following methods:

BET surface area is determined by the BET nitrogen adsorption methods of Brunaur et al., *J. Am. Chem. Soc.*, 60, 309 (1938).

CTAB external surface area of silica and silicates is determined by absorption of CTAB (cetyltrimethylammonium bromide) on the silica surface. The silica or silicate is mixed with CTAB, and the excess CTAB is separated by centrifugation and evaluated by titration with sodium lauryl sulfate using a surfactant electrode. The external surface of the silica is determined from the quantity of CTAB adsorbed (analysis of CTAB before and after adsorption). Specifically, about 0.5 g of silica is placed in a 250-ml beaker with 100.00 ml CTAB solution (5.5 g/L), mixed on an electric stir plate for 1 hour, then centrifuged for 30 minutes at 10,000 rpm. One ml of 10% Triton X-100 is added to 5 ml of the clear supernatant in a 100-ml beaker. The pH is adjusted to 3.0–3.5 with 0.1 N HCl and the specimen is titrated with 0.0100 M sodium lauryl sulfate using a surfactant electrode (Brinkmann SUR15O1-DL) to determine the endpoint.

Pore volume as measured by mercury intrusion (mercury pore volume) is determined using an Autopore II 9220 Porosimeter (Micromeritics Corporation). This instrument measures the void volume and pore size distribution of various materials. Mercury is forced into the voids as a function of pressure and the volume of mercury intruded per gram of sample is calculated at each pressure setting. Total pore volume as expressed herein represents the cumulative volume of mercury intruded at pressures from vacuum to 60,000 psi. Increments in volume (cc/g) at each pressure setting are plotted against the pore radius corresponding to the pressure setting increments. The peak in the intruded volume versus pore radius curve corresponds to the mode in the pore size distribution and identifies the most common pore size in the sample. A contact angle of 140° and a surface tension of 485 dyne/cm are used.

Pore size maximum is defined as the specific pore size, expressed as pore diameter in $\mu$m, having the highest differential intruded volume where differential intruded volume=dV/dD in cc Hg/g-$\mu$m.

Brookfield viscosity (RVT type) is determined on a sample of pigment in aqueous suspension. The sample is agitated for one minute at a rate of 120 rpm without entrapment of air and allowed to stand for 5±0.1 minutes. The Brookfield spindle appropriate to cover the expected viscosity range is immersed in the sample to the middle of the spindle notch. After 5 revolutions at the selected spindle speed the spindle is stopped and the viscosity value is recorded. The average of two trials is used as the viscosity value so long as the two trials have values within ±50 cps; otherwise the measurements are repeated.

Hercules viscosity is measured using a DV-10 High Shear Viscometer. The Hercules Hi-Shear Viscometer utilizes concentric cylinders with a well-defined geometry to measure a fluid's resistance to flow and to determine its viscous behavior in this simple-shear flow field. Because the gap between the rotating inner cylinder (bob) and the restrained outer cylinder (cup) is very small, the annular flow between the two cylinders approximates a velocity-driven (Couette) flow. When a fluid sample is confined between the bob and cup, rotation of the bob generates a velocity gradient across the gap. This gradient is termed shear rate and defined as the change in linear velocity (cm/sec) between two fluid elements divided by their distance in centimeters. Thus, shear rates are expressed in reciprocal seconds ($sec^{-1}$). While rotation of the bob causes the fluid to flow, its resistance imposes a shear stress on the inner wall of the cup, measured in dynes/$cm^2$. Absolute viscosity can be calculated at any shear rate.

Rheograms of thixotropic fluids are characterized by a hysteresis loop between the increasing shear rate (up) and the decreasing shear rate (down) curves. Upon shearing, the fluid attains a state of lower potential energy due to structural changes which depend on both chemical and hydrodynamic processes. The loop quantifies power loss during continuous input of energy into the fluid sample undergoing testing and it is independent of any thermal effects. The amount of thixotropic breakdown is sensitive to the previous shear history of the fluid, since structure reforms upon cessation of flow, but also depends on the rate of change of shear value.

Oil absorption, using linseed oil, is determined by the rubout method. The rubout method involves mixing oil and a silicate on a smooth surface with a spatula until a stiff putty-like paste is formed. The silicate sorptive capacity is determined by measuring the quantity of oil required to saturate the silicate, i.e., the quantity of oil required to form a paste mixture which will curl when spread out. The oil absorption is then calculated as follows:

$$\text{Oil absorption} = \frac{cc \text{ oil absorbed}}{\text{weight of silica, grams}} \times 100$$

$$= cc \text{ oil}/100 \text{ gram silica}$$

Particle size is determined using a Leeds and Northrup Microtrac II. A laser beam is projected through a transparent cell which contains a stream of moving particles suspended in a liquid. Light rays which strike the particles are scattered through angles which are inversely proportional to their sizes. The photodetector array measures the quantity of light at several predetermined angles. Electrical signals proportional to the measured light flux values are then processed by a microcomputer system to form a multi-channel histogram of the particle size distribution.

The invention will now be described through illustrative examples. The examples are not intended to limit the scope of the invention defined in the appended claims.

EXAMPLE 1

A reactor was charged with 1929 gallons of a 13.3% solution of sodium silicate. The silicate solution was heated in the reactor to 65° C., then more of the same silicate solution added to the reactor at 67.6 GPM while, simultaneously, a sulfuric acid/alum mixture of 11.4% sulfuric acid and 15.4% alum was added at 43.4 GPM. The ratio of the acid to alum in the added mixture was 1:0.66. After 47 minutes of the simultaneous addition, the silicate addition was halted, and the acid/alum addition continued for approximately 14 minutes. The reaction mixture was then allowed to digest for 10 minutes at 65° C., after which silicate precipitate was filtered, washed, spray-dried to 10.0% maximum moisture and milled to an average particle size of 7.3 μm.

The product silicate pigment in accordance with the invention (referred to hereinafter as "Example 1") exhibited the characteristics reported in Table I.

EXAMPLE 2

A reactor was charged with 181 liters of a 13.3% solution of sodium silicate. The silicate solution was heated in the reactor to 70° C., then more of the same silicate solution added to the reactor at 6.3 LPM while, simultaneously, a sulfuric acid/alum mixture of 11.4% sulfuric acid and 15.4% alum was added at 4.1 LPM. The ratio of the acid to alum in the added mixture was 1:0.81. After 47 minutes of the simultaneous addition, the silicate addition was halted, and the acid/alum addition continued for approximately 14 minutes. The reaction mixture was then allowed to digest for 10 minutes at 70° C., after which silicate precipitate was filtered, washed, spray-dried to 10.0% maximum moisture and micronized to an average particle size of 4.9 μm.

The product silicate pigment in accordance with the invention (referred to hereinafter as "Example 2") exhibited the characteristics reported in Table I.

EXAMPLE 3

A reactor was charged with 181 liters of a 13.3% solution of sodium silicate. The silicate solution was heated in the reactor to 65° C., then more of the same silicate solution was added to the reactor at 6.3 LPM while, simultaneously, a sulfuric acid/alum mixture of 11.4% sulfuric acid and 15.4% alum was added at 4.1 LPM. The ratio of the acid to alum in the added mixture was 1:0.3. After 47 minutes of the simultaneous addition, the silicate addition was halted, and the acid/alum addition continued for approximately 14 minutes. The reaction mixture was then allowed to digest for 10 minutes at 65° C., after which silicate precipitate was filtered, washed, spray-dried to 10.0% maximum moisture and micronized to an average particle size of 5.2 μm.

The product silicate pigment in accordance with the invention (referred to hereinafter as "Example 3") exhibited the characteristics reported in Table I.

TABLE I

|  | Example 1 product | Example 2 product | Example 3 product |
|---|---|---|---|
| % Moisture (105°, 2 hr.) | 8.3 | 9.5 | 7.7 |
| % LOI (900° C., 2 hr.) | 10.0 | 6.9 | 9.1 |
| % $SiO_2$ | 81.1 | 85.6 | 85.2 |
| % $Al_2O_3$ | 4.3 | 5.4 | 2.9 |
| % $Na_2O$ | 3.2 | 3.6 | 2.2 |
| % $Na_2SO_4$ | 0.89 | 0.24 | 0.38 |
| Oil absorption, cc/100 g | 205 | 200 | 214 |
| APS, μm | 7.3 | 4.9 | 4595 |
| B.E.T., $m^2/g$ | 493 | 460 |  |
| CTAB, $m^2/g$ | 201 | 188 | 191 |
| Pore vol., cc | 4.92 | 5.10 | 5.01 |
| Pore max., μm | 0.015 | 0.0135 | 0.025 |

Properties of three conventional silica pigments, each commercially available and used in paper coating applications, are provided in Table II for comparison.

TABLE II

| Property | Silica A | Silica B | Silica C |
|---|---|---|---|
| Oil absorption, cc/100 g | 220 | 200 | 210 |
| APS, μm | 3.8 | 11.7 | 7.4 |
| B.E.T., $m^2/g$ | 230 | 260 | 478 |
| CTAB, $m^2/g$ | 127 | 133 | 297 |
| Pore volume, cc | 5.9 | 5.4 | 4.1 |
| Pore maximum., μm | 0.04 | 0.04 | 0.006 |
| % $Al_2O_3$ | 0.75 | 0.79 | 0.17 |

As Table II shows, none of the conventional silica pigments possess the invention's unique combination of surface area, pore volume and alumina content.

To compare the rheologies of the Example 1 silicate pigment to conventional silicas A and B, slurries were prepared for each of the pigments and evaluated for Brook field viscosity at various spindle speeds. The results are shown in Table III.

TABLE III

Comparison of Pigment Slurry Rheology - Brookfield

| Sample | % Solids | Viscosity, cps 10 RPM | Viscosity, cps 50 RPM | Viscosity, cps 100 RPM |
|---|---|---|---|---|
| Conventional silica A | 13.0 | 7980 | 3904 | 2310 |
| Conventional silica B | 16.0 | 6920 | 3048 | 1752 |
| Pigment, Example 1 | 31.2 | 3620 | 1080 | 804 |

As shown in Table III, even though the % solids of the Example 1 slurry was far greater than that used for the silica A and B slurries, the Brookfield viscosity at every spindle speed was significantly and surprisingly lower for the Example 1 slurry. As described above and demonstrated in this example, markedly higher solids content is achieved with the invention without the detrimental viscosity build typically associated with highly porous/high surface area pigments, thereby allowing more silicate pigment to be applied to and retained on coated print recording media. As a result, the amount of ink dye positioned in the path of light reflected from the substrate to the eye is maximized while, at the same time, the amount of dye absorbed in the pigment layer or substrate layer is minimized.

EXAMPLE 4

As a further comparison of the rheological performance of a silicate pigment in accordance with the invention with prior art pigments suitable for ink jet coatings, simple coating colors were prepared using the Example 1 silicate pigment and silicas A and B described above. Each simple coating color was produced with a pigment in combination with ground calcium carbonate (GCC). Aqueous pigment slurries were prepared and added to a starch/polyvinyl alcohol binder system along with some typical coating additives, as shown in Table IV.

TABLE IV

Coating Color Formulation

| | Slurry Solids, % | Coating Color A Dry (parts) | Coating Color B Dry (parts) | Coating Color C Dry (parts) |
|---|---|---|---|---|
| Pigments: | | | | |
| CaCO₃ | 74.8 | 80.0 | 80.0 | 80.0 |
| Conventional silica A | 13.1 | 20.0 | | |
| Conventional silica B | 13.1 | | 20.0 | |
| Pigment, Example 1 | 31.9 | | | 20.0 |
| Additives: | | | | |
| Styrene Maleic Anhydride | 24.2 | 6.0 | 6.0 | 6.0 |
| Optical brightener | 45.2 | 3.0 | 3.0 | 3.0 |
| Ammonium zirconium carbonate (AZC) | 30.5 | 1.5 | 1.5 | 1.5 |
| Binders: | | | | |
| Penford Gum 290 | 30 | 80.0 | 80.0 | 80.0 |

TABLE IV-continued

Coating Color Formulation

| | Slurry Solids, % | Coating Color A Dry (parts) | Coating Color B Dry (parts) | Coating Color C Dry (parts) |
|---|---|---|---|---|
| Airvol 203 | 30 | 20.0 | 20.0 | 20.0 |
| Total Coating Color, % Solids | — | 33.1 | 33.5 | 33.2 |

Coating colors were evaluated using a Brookfield RVT viscometer to determine the low shear viscosity. All coating colors were adjusted to 33±0.5% total solids. As revealed in Table V, the coating containing a silicate pigment in accordance with the invention (Coating Color C) exhibited much better (i.e., lower) low shear viscosity at 10, 50 and 100 RPM values than the coating containing the conventional silica pigments (Coating Colors A and B).

TABLE V

Coating Color Viscosity - Brookfield Rheology

| Sample | % Solids | Viscosity, cps 10 RPM | Viscosity, cps 50 RPM | Viscosity, cps 100 RPM |
|---|---|---|---|---|
| Coating Color A | 33.1 | 3920 | 1620 | 1186 |
| Coating Color B | 33.5 | 3160 | 1754 | 1390 |
| Coating Color C | 33.2 | 2920 | 1424 | 1096 |

EXAMPLE 5

In this example, the rheological behavior of a silicate pigment produced as described in Example 1 was compared to a conventional hybrid-gel silica pigment used commercially in coating applications. Table VI reveals that the slurry containing the Example 1 silicate exhibited reduced low shear Brookfield viscosity as compared with the conventional silica pigment slurry, which is particularly surprising in light of the significantly higher solids content of the Example 1 pigment slurry.

TABLE VI

Comparison of Pigment Slurry Rheology - Brookfield

| Pigment | % Solids | Viscosity, cps 10 RPM | Viscosity, cps 50 RPM | Viscosity, cps 100 RPM |
|---|---|---|---|---|
| Conventional silica C | 19.8 | 4560 | 1158 | 612 |
| Example 1 silicate | 30.4 | 3670 | 982 | 542 |

The high shear rheology of the slurries was also compared, and the results are reported in Table VII. The high-solids pigment slurry containing the Example 1 silicate initially exhibited higher viscosity than the low-solids comparative hybrid-gel silica slurry. However, the Example 1 pigment slurry, even at a much higher solids content, exhibited high shear viscosity and hysteresis low shear viscosity similar to the comparative hybrid-gel silica slurry at a low solids content.

TABLE VII

Comparison of Pigment Slurry Rheology - Hercules

| Pigment | % Solids | Viscosity, cps 10 RPM | Viscosity, cps 50 RPM | Viscosity, cps 100 RPM |
|---|---|---|---|---|
| Conventional silica C | 19.8 | 41 | 26 | 18 |
| Example 1 silicate | 30.4 | 370 | 32 | 42 |

EXAMPLE 6

A high quality coating color for non-impact printing applications was produced from the silicate pigment of Example 2 as described in Table VIII. For comparison, a coating color was prepared with a hybrid-gel silica commercially used in ink jet coatings.

TABLE VIII

Coating Color Formulation

| | Solids, % | Coating Color D Dry (parts) | Coating Color E Dry (parts) |
|---|---|---|---|
| Pigments: | | | |
| Conventional silica C | 20.2 | 72.0 | |
| Pigment, Example 2 | 30.8 | | 80.0 |
| Additives: | | | |
| Styrene Maleic Anhydride | 24.2 | 6.0 | 6.0 |
| Optical brightener | 45.2 | 3.0 | 3.0 |
| AZC | 30.5 | 1.5 | 1.5 |
| Binders: | | | |
| Penford Gum 290 | 30 | 10.0 | 10.0 |
| Airvol 203 | 30 | 90.0 | 90.0 |
| Total Coating Color, % Solids | — | 23.4 | 27.4 |

The Brookfield viscosity and Hercules rheology of both coating colors were evaluated, and the results are presented in Figure. As shown in the FIGURE, Coating Color E (produced using a silicate pigment in accordance with the invention) exhibited superior low shear viscosity and high shear rheology as compared with the conventional hybrid-gel silica based Coating Color D.

EXAMPLE 7

In this example, silicate pigments in accordance with the invention were compared to a conventional pigments in terms of color performance. Silicate pigments in accordance with the invention, referred to as Inventive Example A and Inventive Example B, were prepared as follows. Inventive Example A was prepared by charging a reactor with 278 liters of a 13.3% solution of sodium silicate. The silicate solution was heated in the reactor to 65° C., then more of the same silicate solution added to the reactor at 9.7 LPM while, simultaneously, a sulfuric acid/alum mixture of 11.4% sulfuric acid and 15.4% alum was added at 6.3 LPM. The ratio of the acid to alum in the added mixture was 1:0.81. After 47 minutes of the simultaneous addition, the silicate addition was halted, and the acid/alum addition continued for approximately 14 minutes. The reaction mixture was then allowed to digest for 10 minutes at 65° C., after which silicate precipitate was filtered, washed, spray-dried to 10.0% maximum moisture and milled to an average particle size of 4.4 $\mu$m.

Inventive Example B was prepared by charging a reactor with 181 liters of a 13.3% solution of sodium silicate. The silicate solution was heated in the reactor to 75° C., then more of the same silicate solution was added to the reactor at 6.3 LPM while, simultaneously, a sulfuric acid/alum mixture of 11.4% sulfuric acid and 15.4% alum was added at 4.1 LPM. The ratio of the acid to alum in the added mixture was 1:0.67. After 47 minutes of the simultaneous addition, the silicate addition was halted, and the acid/alum addition continued for approximately 14 minutes. The reaction mixture was then allowed to digest for 10 minutes at 75° C., after which silicate precipitate was filtered, washed, spray-dried to 10.0% maximum moisture and micronized to an average particle size of 5.7 $\mu$m.

Various characteristics of Inventive Silicates A and B were evaluated, and the results are reported in Table IX.

TALBE IX

| | Inventive Example A | Inventive Example B |
|---|---|---|
| % Moisture(105°, 2 hr.) | 4.8 | 9.0 |
| % LOI (900° C., 2 hr.) | 10.2 | 6.6 |
| % SiO$_2$ | 78.6 | 85.8 |
| % Al$_2$O$_3$ | 4.95 | 5.16 |
| % Na$_2$O | 4.3 | 3.7 |
| % Na$_2$SO$_4$ | 2.54 | 0.10 |
| Oil absorption, cc/100 g | 200 | 200 |
| APS, $\mu$m | 4.4 | 5.7 |
| B.E.T., m$^2$/g | 354 | 460 |
| CTAB, m$^2$/g | 188 | 202 |
| Pore vol., cc | 4.76 | 4.53 |
| Pore max., $\mu$m | 0.014 | 0.012 |

Pigment slurries were produced from Inventive Examples A and B, and from a conventional silica. The slurries were incorporated into coating colors which were then applied to a suitable fine paper basestock using a laboratory bench blade coater. The coated papers were calendered to simulate machine calendering, allowed to equilibrate at TAPPI standard conditions and printed using an Hewlett Packard Color Deskjet printer. An X-rite Model 428 handheld densitometer was used to evaluate the color density of solid cyan, yellow and magenta printed areas. The densitometer readings were used to calculate the Composite Color Density (CD) through the formula $\rho$ (OD$_{cyan}$+OD$_{yellow}$+OD$_{magenta}$), and the results are shown in Table X.

TABLE X

| Pigment | Black, Density | Color, CD | Coat Weight, g/m$^2$ |
|---|---|---|---|
| Inventive Example A | 1.00 | 3.2 | 5.0 |
| Inventive Example B | 0.97 | 3.0 | 5.4 |
| Conventional silica | 0.91 | 3.0 | 4.4 |

As shown in Table X, the ability of the novel silicate pigments to be made to higher % pigment solids than the conventional silica allowed the sheets to be coated at a higher coat weight. Consequently, higher black density and color composite density were achieved with the silicate pigments in accordance with the invention.

The Examples demonstrate the surprising rheological and color performance of the invention as compared with conventional pigments. The unique combination of high porosity, high surface area and low viscosity build provided by the invention enables improved coating performance for print recording media applications.

While the invention has been described herein with reference to specific and preferred embodiments, it is understood that modifications, substitutions, omissions and changes may be made without departing from the spirit and scope of the invention defined in the appended claims.

We claim:

1. An amorphous silicate pigment comprising a pore volume of at least about 4.0 ml/g as measured by mercury intrusion, a BET surface area of at least about 400 m$^2$/g, and an $Al_2O_3$ content of about 2.0 to 10.0 wt %.

2. An amorphous silicate pigment according to claim 1, wherein the BET surface area is about 400 to 500 m$^2$/g.

3. An amorphous silicate pigment according to claim 1, wherein the $Al_2O_3$ content is about 3.0 to 7.0 wt %.

4. An amorphous silicate pigment according to claim 2, wherein the $Al_2O_3$ content is about 3.0 to 7.0 wt %.

5. An amorphous silicate pigment according to claim 1, further comprising a linseed oil absorption of about 180 to 250 cc/100 g.

6. An amorphous silicate pigment according to claim 1, further comprising a linseed oil absorption of about 190 to 220 cc/100 g.

7. An amorphous silicate pigment according to claim 1, wherein said pore volume is about 4 to 7 cc Hg/g, and further comprising a pore size maximum of about 0.005 to 0.030 μm diameter.

8. An amorphous silicate pigment according to claim 1, wherein said pore volume is about 5 to 6 cc Hg/g, and further comprising a pore size maximum of about 0.014±0.003 μm diameter.

9. An amorphous silicate pigment according to claim 1, further comprising an average particle size of about 2 to 8 μm as measured by laser light scattering.

10. An amorphous silicate pigment according to claim 1, further comprising an average particle size of about 4 to 6 μm as measured by laser light scattering.

11. An amorphous silicate pigment according to claim 1, wherein said pore volume is about 4 to 7 cc Hg/g, and further comprising a linseed oil absorption of about 180 to 250 cc/100 g, and an average particle size of about 2 to 8 μm as measured by laser light scattering.

12. An amorphous silicate pigment according to claim 4, wherein said pore volume is about 4 to 7 cc Hg/g, and further comprising a linseed oil absorption of about 180 to 250 cc/100 g, a pore size maximum of about 0.005 to 0.030 μm diameter, and an average particle size of about 2 to 8 μm as measured by laser light scattering.

13. An amorphous silicate pigment according to claim 1, wherein said pore volume is about 5 to 6 cc Hg/g, and further comprising a linseed oil absorption of about 190 to 220 cc/100 g, a pore size maximum of about 0.014±0.003 μm diameter, and an average particle size of about 4 to 6 μm as measured by laser light scattering.

14. An amorphous silicate pigment according to claim 4, wherein said pore volume is about 5 to 6 cc Hg/g, and further comprising a linseed oil absorption of about 190 to 220 cc/100 g, and an average particle size of about 4 to 6 μm as measured by laser light scattering.

15. A coating for a print recording medium comprising a binder and an amorphous silicate pigment according to claim 1.

16. A coating for a print recording medium comprising a binder and an amorphous silicate pigment according to claim 4.

17. The coating for a print recording medium according to claim 15 wherein said coating is in the form of an aqueous pigment slurry containing at least about 30% solids of said silicate pigment according to claim 1, and wherein said pigment slurry exhibits a Brookfield viscosity at 10 rpm of less than about 6000 cps.

18. The coating for a print recording medium according to claim 15 wherein said coating is in the form of an aqueous pigment slurry containing at least about 30% solids of said silicate pigment according to claim 1, and wherein said pigment slurry exhibits a Brookfield viscosity at 10 rpm of less than about 10,000 cps.

19. A method of producing the amorphous silicate pigment of claim 1, the steps which comprise:
   a) precipitating a silicate in a reaction medium at a temperature of about 50 to 85° C., and
   b) adding a reactive source of aluminum during said precipitating step.

20. The method according to claim 19, wherein said reactive source of aluminum is at least one compound selected from the group consisting of sodium aluminate, aluminum chloride and aluminum sulfate.

21. A method of producing the amorphous silicate pigment of claim 1 comprising the steps of:
   precipitating a silicate in a reaction medium at a temperature of about 50° C. to about 85° C.; adding a mixture of an acid and a reactive source of aluminum during said precipitating step.

22. The method of claim 21 wherein said reactive source of aluminum is at least one compound selected from the group consisting of sodium aluminate, aluminum chloride and aluminum sulfate.

23. The method of claim 21 further including the step of spray drying said precipitated silicate.

24. The method of claim 23 wherein said precipitated silica has a moisture content of less than about 10.0%.

25. A print recording medium comprising a print recording substrate and an amorphous silicate pigment according to claim 1.

* * * * *

UNITED STATES PATENT AND TRADEMARK OFFICE
CERTIFICATE OF CORRECTION

PATENT NO.   : 6,171,384 B1
DATED        : January 9, 2001
INVENTOR(S)  : Donald P. Conley, Gary W. Loock, Barry W. Preston and Michael C. Withiam It is certified that error appears in the above-identified patent and that said Letters Patent is hereby corrected as shown below:

Column 6, Table I, Column 4, Row 8,
Delete "4595" and insert -- 5.2 -- therefor.

Column 6, Table I, Column 4, Row 9,
Insert -- 498 --.

Column 9, Table VIII, Column 3, Row 3,
Delete "80.0".

Column 9, Table VIII, Column 4, Row 3,
Insert -- 80.0 --

Column 10,
Line 43, delete "$\rho$" and insert -- $\Sigma$ -- therefor.

Signed and Sealed this

Twenty-eighth Day of May, 2002

Attest:

JAMES E. ROGAN
*Attesting Officer*   *Director of the United States Patent and Trademark Office*